(12) United States Patent
Long (10) Patent No.: US 9,986,827 B1
(45) Date of Patent: Jun. 5, 2018

(54) FISHING ROD HOLDER (71) Applicant: Preston Long, Livingston, LA (US)

(72) Inventor: Preston Long, Livingston, LA (US)

( * ) Notice: Subject to any disclaimer, the term of this patent is extended or adjusted under 35 U.S.C. 154(b) by 15 days.

(21) Appl. No.: 15/428,787

(22) Filed: Feb. 9, 2017

(51) Int. Cl.
*B60R 9/08* (2006.01)
*A01K 97/10* (2006.01)
*A47B 81/00* (2006.01)
*B60R 9/06* (2006.01)
*B60B 33/00* (2006.01)

(52) U.S. Cl.
CPC ............. *A47B 81/005* (2013.01); *A01K 97/10* (2013.01); *B60B 33/0002* (2013.01); *B60R 9/06* (2013.01); *B60R 9/08* (2013.01); *Y10S 224/922* (2013.01)

(58) Field of Classification Search
CPC ........ A01K 97/10; B60R 9/08; Y10S 224/922
USPC .................... 224/922; 43/21.2; D3/147, 148; 211/70.8
See application file for complete search history.

(56) References Cited

U.S. PATENT DOCUMENTS

| 4,871,099 | A | * | 10/1989 | Bogar, Jr. | ............... | A01K 97/10 211/70.8 |
| 5,435,473 | A | * | 7/1995 | Larkum | .................... | B60R 9/08 211/4 |
| 5,715,952 | A | * | 2/1998 | Chichetti | ............... | A01K 97/10 211/70.8 |
| 5,813,164 | A | * | 9/1998 | Liberto | ................. | A01K 97/10 43/21.2 |
| 7,172,164 | B2 | * | 2/2007 | Fuelling | ................. | A01K 97/10 248/309.1 |
| 8,375,622 | B1 | * | 2/2013 | Holzmann, Jr. | ........ | A01K 97/10 43/21.2 |
| 8,800,788 | B1 | * | 8/2014 | Guidry | .................... | A01K 97/10 211/70.8 |
| 9,565,934 | B2 | * | 2/2017 | Hall, II | ................ | A47B 81/005 |
| 2005/0178041 | A1 | * | 8/2005 | Zaffiro | .................... | A01K 97/10 43/21.2 |
| 2011/0179692 | A1 | * | 7/2011 | McKnight | .............. | A01K 97/08 43/21.2 |
| 2014/0110363 | A1 | * | 4/2014 | Brown | .................. | A47F 7/0021 211/70.8 |
| 2016/0045024 | A1 | * | 2/2016 | Roberts | ................ | A47B 81/005 248/512 |

* cited by examiner

*Primary Examiner* — Justin Larson
(74) *Attorney, Agent, or Firm* — Roy Kiesel Ford Doody & Thurmon APLC (57) ABSTRACT

A fishing rod holder is disclosed. The rod holder is configured for installation in a pick-up truck, and it has a rod holder component and a separate mounting base. The mounting base is installed into the bed of the pick-up truck and the rod holder may then be installed and removed from the truck as needed. Quick release mechanisms are disclosed for securing the rod holder to the mounting base. Locking means, wheels and other features are also disclosed.

23 Claims, 7 Drawing Sheets

FISHING ROD HOLDER

BACKGROUND

Fishing rod holders are in common use by anglers. These rod holders come in many designs and serve many purposes. Some rod holders are made to be permanently installed in a home, camp, or shop, as a place to store rods when they are not in use. Other rod holders are installed on boats, to either store rods until they are needed, or to hold a rod when it is being used, for example, while trolling. Rod holders are also used in vehicles to hold the rods when they are being transported to and from a fishing location.

The latter type of rod holder is becoming more common as more anglers live and fish in different places. Some anglers simply put their rods into rod holders on their boat and then pull the boat (on a trailer) to the fishing location. This arrangement works for some anglers, but it does not work for all anglers. Some boats have rod holders mounted high, that is, above the heads of anglers standing in the boat. This may work well when the boat is in the water, but it is not a viable option for transporting rods over a long distance while the boat is being towed behind a vehicle. If that were done, the rods may extend up to 20' into the air, and might hit many objects like the underside of highway overpasses and bridges, not to mention low-hanging power lines. If the rods hit such items, the rods probably would be damaged or broken beyond repair.

In addition, many anglers leave their boats at the fishing location. Some fishing boats are too large to trailer, and therefore, are kept at marinas. Other boats are kept on trailers at marinas or in storage locations near the desired marina. These arrangements allow the angler to simply drive a vehicle to the fishing location, thus eliminating the need to tow a boat. These anglers face a difficult choice concerning their rods and reels. They can leave this gear with the boat, or they can transport it back and forth.

The latter option is preferred by many anglers for a number of reasons. First, fishing rods and reels can be quite expensive, and the potential loss through theft from a stored boat is a big concern. Some fishing rod and reel combinations costs several thousand dollars. Even with security at a marina, few anglers will feel safe leaving tens of thousands of dollars of gear on their boat. For the same reason, most anglers remove portable electronic gear from boats kept in storage, too.

This creates a need for a rod holder in the angler's vehicle. A number of designs have been created for this purpose. Most are designed for use with pick-up trucks or sport utility vehicles (SUVs), because most anglers use these types of vehicles. Pick-up truck mounted rod holders typically feature a single bar or other long member that extends from one side of the truck bed to the other, usually in the direction perpendicular to the length of the truck. A number of individual rod holders (e.g., 4-6) are installed on the bar or rod, and the assembly is then secured to the truck bed.

These typical pick-up truck rod holders work reasonably well, but they suffer from a number of problems. For example, most are not securely mounted to the truck. Some use pressure exerted against the sides of the truck bed to secure the rod holder. Others secure the rod holders to existing tie-down brackets or other structure in a truck bed. These designs are not very secure. They may become detached from the truck bed due to vibrations during travel. In addition, they are vulnerable to theft, because a would-be thief need only disconnect the rod holder from the truck bed and the entire assembly can then be taken.

These rod holders are also too small. They typically hold 4-6 rods in a single row. That is not sufficient for many anglers. Many anglers will take eight or more rods with them on a fishing trip. If the fishing crew includes four anglers, then it is likely the group will bring at least eight rod and reel combinations. There is a need for a solid and secure rod holder with a larger capacity than is found in current products.

Existing pick-up truck bed rod holders are also not solid and robust enough for use with large, expensive tackle. Some large rod and reel combinations weigh several pounds each, and a rack holding 4-6 such rods needs to be capable of supporting 30 or 40 pounds or more. The existing rod holders simply lack the strength and durability to handle rods of that size. This is a key shortcoming, because the larger rod and reel combinations are typically the most expensive, and for that reason, anglers using this type of tackle need a very secure and reliable rod holder.

To make a rod holder more secure and less prone to theft by removal from the vehicle, some designers have made rod holders that are directly mounted to the truck bed. These rod holders provide more stability and security, but they cannot be easily removed from the truck. These designs are typically permanent or semi-permanent additions to a pick-up truck bed. This arrangement is not desirable, because most anglers who own pick-up trucks use their trucks for other things, like hauling plywood sheets, landscaping materials, or other things. Having a fishing rod holder always taking up space in the bed of the truck is not desirable.

Anglers, particularly salt water anglers, need to clean their fishing rods and reels after a fishing trip. There are many ways to do this, but most anglers probably just wash their rod and reel combinations one-at-a-time, with each combo leaned against some structure while it is washed. There is a need, therefore, for a rod holder that could be used to make cleaning the tackle easier for anglers.

SUMMARY OF THE INVENTION

The present invention meets many of the needs identified above. It is a two-part fishing rod holder designed primarily for use in a pick-up truck bed. The present invention is very solid, secure, and durable. In preferred embodiments, the invention is made of large aluminum tubing, with an all-welded construction. The invention has a separate mounting base that is permanently or semi-permanently installed in the bed of a pick-up truck. This mounting base is designed to create a minimal obstruction, thus allowing the user full use of the truck bed when the rod holder is not installed.

The present invention provides a structure that will support two or more rows of individual rod holders. Each row can support six or more individual rod holders, for a total capacity of 15 or more rod holders. This is far superior to the existing rod holders. In the present invention, each individual rod holder is securely mounted to the large, robust main frame. In preferred embodiments, the individual rod holders are welded to a mounting bracket which is then welded to the support frame. The result is an all-welded construction that is very robust and that can easily handle the weight of any group of large fishing rod and reel combinations. Indeed, the present invention is capable of supporting 100 pounds or more of tackle. No prior art design is comparable to the present invention in this regard.

The present invention also provides a portable rod holder that can be easily removed from the truck bed. A quick release mechanism is provided, together with a very solid tab-and-slot base mounting design. Together these allow for a very secure and solid design that can be quickly and easily installed and removed from the vehicle. In addition, the present invention may include wheels and a handle that allow a user to easily roll the rack before installation or after removal.

The present invention also provides, in a preferred embodiment, a kick stand that can be rotated into position. Once in its extended position, the kick stand will securely support the rod holder when it is not installed in the truck. This feature, especially when coupled with the wheels identified above, allow a user to easily move the rod holder and then support it outside the truck. This can be done with the rod and reel combinations still in the rod holder, which allows anglers a convenient way to clean their gear. When the clean-up is complete, an angler may release the kick stand and roll the rack, with rods in place, into a garage or other secure storage location. Once stored, the kick stand may be engaged again, and the rack stored with the rods in place. This is a major departure from the prior art, because with the present invention, a single product may be used to hold the rods when they are stored, when they are being transported (i.e., in the pick-up truck bed), and when they are being washed. The present invention, therefore, replaces as many as three different existing devices.

In a particular embodiment, the present invention includes: a mounting base configured for installation in the bed of a pick-up truck, the mounting base having a first quick release mechanism and a pair of receiving members; and, a fishing rod holder, having a main support frame constructed of metal tubing having a diameter of at least one inch; a first rod holder support member constructed of a single piece of metal tubing having a diameter of at least one inch, and where the first rod holder support member is connected to the main support frame; a second rod holder support member constructed of a single piece of metal tubing having a diameter of at least one inch, and where the second rod holder support member is connected to the main support frame; a plurality of individual rod holders connected to the first and second rod holder support members, where there are at least four individual rod holders connected to the first rod holder support member and at least five individual rod holders connected to the second rod holder support member; a pair of engaging members at the lower ends of the main support, where the engaging members are configured to quickly and securely engage with the receiving members of the mounting base; and, a second quick release mechanism configured to engage with the first quick release mechanism of the mounting base.

DETAILED DESCRIPTION OF PREFERRED EMBODIMENTS OF THE PRESENT INVENTION

Figure 1:
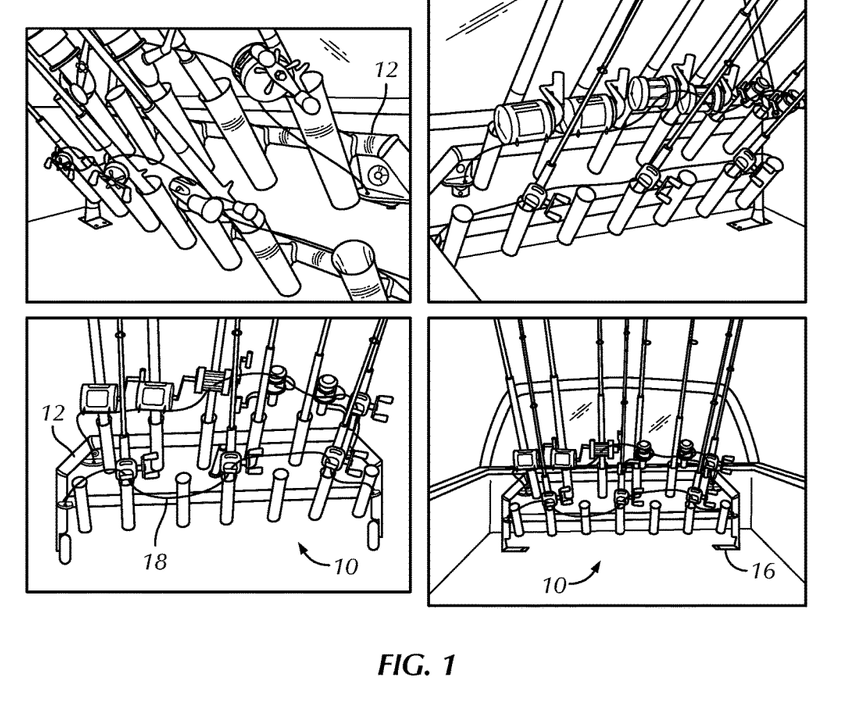
FIG. 1 is an illustration of the present invention installed in a pick-up truck bed.

FIG. 1 shows a group of general representations of a preferred embodiment of the invention. The fishing rod holder 10 is show installed in the bed of a pick-up truck. The main support frame 12 has a first rod holder support member 22 and a second rod holder support member 24. These members are substantially horizontal when the invention is in use. A third support member could be added to increase the rod holding capacity of the invention. The support frame 12 is strong enough to support at least three rows of rod holders.

Figures 2, 3, 4, 5:
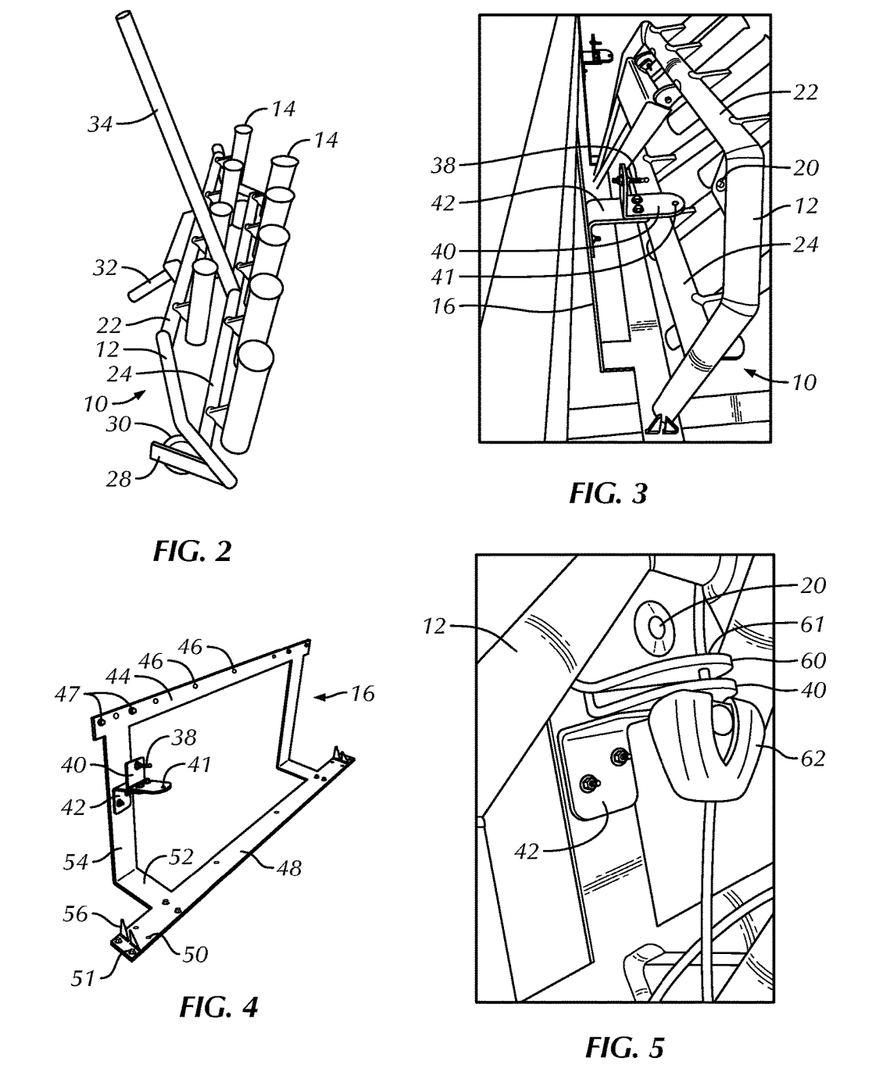
FIG. 2 is a representation of the present invention in a resting position outside of a pick-up truck bed.
FIG. 3 is a close-up view of the present invention being installed in or removed from a pick-up truck bed.
FIG. 4 is a view of the separate mounting base of the present invention.
FIG. 5 is a close-up view of a locking feature of the present invention.
Figure 8:
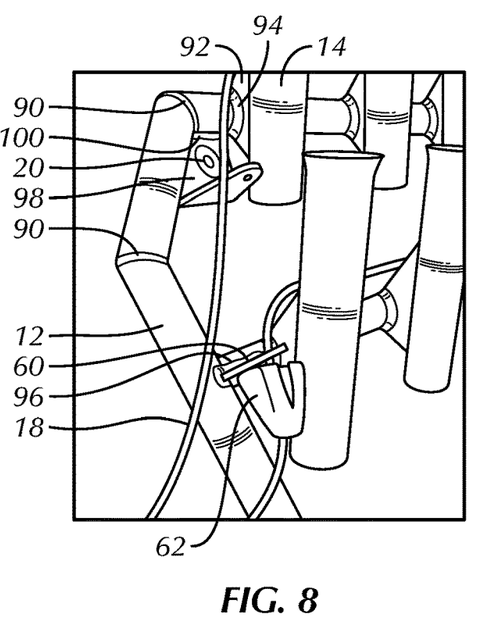
FIG. 8 is a close-up view of part of the support frame of the present invention.
Figure 10:
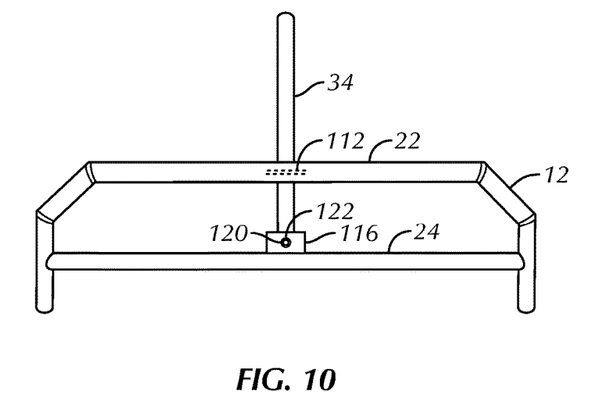
FIGS. 10-14 are various views of an embodiment of the invention having a removable handle.
Figure 19:
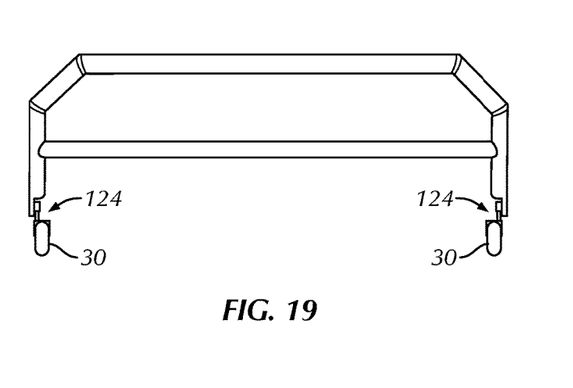

In a preferred embodiment, the main support frame 12 is constructed of a plurality of pieces of metal tubing welded together (see welds 90 in FIG. 8, and also in FIGS. 3, 10, and 19). The first and second rod holder support members (22, 24) are each a single piece of metal tubing in this embodiment, and are welded to the main support frame 12. The tubing used is at least one inch in diameter, and in another preferred embodiment, the tubing is at least 1.25" in diameter. An aluminum alloy is used in these preferred embodiments because it is strong and light. In these embodiments, the structure is capable of supporting at least 50 pounds of fishing gear if 1" tubing is used, and at least 100 pounds if 1.25" tubing is used. This strength is well beyond what typical prior art rod holders provide.

This capability is important for anglers who pursue large salt water game fish. Some reels used for this type of fishing weigh more than 10 pounds. With 8-10 rod and reel combinations of this type in the rod holder 10, the total weight being held could exceed 100 pounds. The present invention is more than capable of supporting this must weight. The secure mounting base 16 and the solid connection between the base 16 and the rod holder 10 means that even when fully loaded with heavy gear, the present invention will not fail, will not bounce around, and will not allow the rods to bang into each other during transit.

Indeed, the only limiting factor in this regard is the space needed for the fishing tackle held in the rod holder. Two rows of rod holders is a preferred embodiment because it allows for a large number of individual rod holders (13 in the configuration shown in FIG. 1) and sufficient space around the rod holders to secure large fishing rod and reel combinations without them interfering with each other. The invention may be designed for large tackle, and in such an embodiment, there may be as few as four individual rod holders 14 on one support member and five on a second support member, for a total of nine.

The individual rod holders 14 shown in FIG. 1 may include a slot designed to engage a part of the rod or reel in order to hold the rod and reel in a secure position (i.e., so that the rod and reel cannot rotate inside the rod holder). This is not an essential feature, as there are other ways to minimize the movement of a rod and reel inside a rod holder (e.g., by using some type of friction material on the inner surface of the rod holder or a pin or bolt across the lower end of the holder). These features are well known in the art, and any appropriate means may be used with the present invention to better secure a rod within a rod holder.

The present invention uses a two-part structure. The first part is the rod holder 10, which is the primary part shown in FIG. 1. The second part is a mounting base 16, which is mounted in a permanent, or semi-permanent manner in the bed of a pick-up truck. Semi-permanent mounting refers to the use of bolts, nuts, and other components (e.g., lock washers or semi-permanent thread-locking compound applied to the bolt threads) to secure the mounting base 16 to the truck bed in a manner that will not become loose over time. Such a mounting arrangement, however, can be undone, and the mounting base 16 removed. A permanent attachment of the base 16 to the truck bed might involve welding the base 16 to the truck bed or securing it with bolts and nuts treated with permanent thread locking compound. Either mounting arrangement works well and it is up to the user to decide on the best method. Semi-permanent mounting is preferred simply because it is easier to install and gives a user the option to remove the mounting base 16 at a later time. This may be desirable if the user sells the pick-up truck, but wants to keep the rod holder for use in a new vehicle.

FIG. 1 also shows a locking cable 18 which is used to secure the removable rod holder portion 10 from the mounting base 16. The locking cable 18 is also used to lock each individual fishing rod/reel combo to the rod holder 10. This latter locking is typically done by locking the reel to the rack, for example, by threading the locking cable 18 through a permanent structural feature of the reel. Some larger reels have holes or slots designed to connect the reel to a harness or fighting belt, and the locking cable 18 may be routed through such holes or slots to secure these larger (and more expensive) reels to the rod holder 10.

The rod holder portion 10 has a second quick release mechanism 20 (the mechanism is female in the embodiments shown in the figures) that is mated to a first quick release mechanism 38 (not shown in FIG. 1, but male in form in other figures) on the mounting base 16. The first and second quick release mechanisms are male and female, but either form may be used in either position. For example, the first quick release mechanism 38 shown in later figures is male in form, and mates with a female mechanism connected to the rod holder portion 10. This arrangement can be reversed, with the female on the mounting base 16 and the male on the rod holder portion 10. The use of this structure is explained in more detail below, but it provides for simple and quick installation and removal of the rod holder portion 10 from the mounting base 16. Other features described below provide for a secure attachment of these two components, but the quick release makes the process of installation and removal very simple for the user.

The rod holder portion 10 is shown outside the truck bed in FIG. 2. This embodiment shows additional features that make the invention particularly useful. The wheel bracket 28 and wheel 30 are provided to allow the rod holder portion 10 to be easily rolled along the ground, a floor, or even along the bed of a pick-up truck. In FIG. 2, there are no rods in the rod holder portion 10, but in actual use, it would be common for a user to leave the rods and reels in the rod holder portion 10. The rod holder portion 10 can then be removed from the truck with the rods in place, and then rolled to a convenient location.

FIG. 2 also shows a kick stand 32 and a handle 34. The kick stand 32 is attached to the rod holder portion 10 in a manner that allows the kick stand 32 to be stored when the rod holder portion 10 is connected to the mounting base 16. That is, when the rod holder portion 10 is installed in the truck bed, the kick stand 32 is positioned so that it does not make contact with the truck bed. It is similar to a bicycle kick stand in that when the rod holder portion 10 is installed, the kick stand is not needed, and therefore, is disengaged. When the rod holder portion 10 is removed from the mounting base 16, the kick stand 32 can be engaged and will then allow the rod holder portion 10 to remain in an upright position, similar to a bicycle using an engaged kick stand. The kick stand 32 of the present invention allows the rod holder portion 10 to be quite secure and upright without the need for any other support.

The handle 34 can be telescoping, removable, or otherwise designed to be out of the way when the rod holder portion 10 is installed in the truck bed. When the rod holder portion 10 is removed, or being removed, the handle may be extended, engaged, or attached in order to give the user an easy way to move and control the rod holder portion 10. As shown in FIG. 2, when the kick stand 32 is disengaged, a user may support the rod holder portion 10 using the handle 34. The entire assembly, including fishing rods, can then be rolled on the wheels 30.

Figure 20:
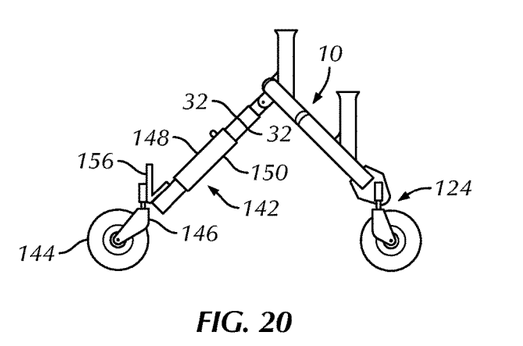
FIGS. 20-23 are various views of an embodiment of the invention having a removable wheeled foot.
Figure 21:
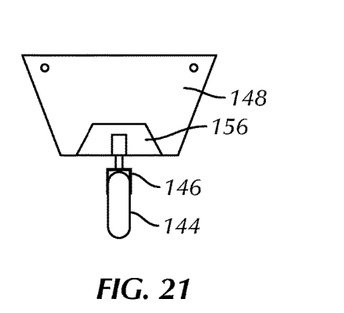
Figure 22:
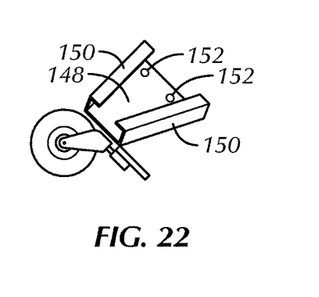
Figure 23:
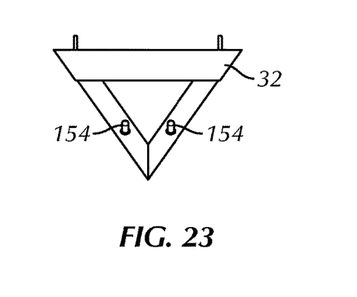

The embodiment shown in FIG. 2 does not illustrate the actual positioning of the various parts of the invention when it is in use outside a pick-up truck bed. This figure is provided to show the various parts, not to provide an accurate depiction of the physical alignment of those parts. In practice, the rod holder 10 will be tilted back slightly and would lean against the extended kick stand. FIG. 20 provides a side view that more closely depicts the present invention being used outside of a truck bed. In the embodiment shown in FIG. 20, there are wheels at each lower end of the main support frame 12 and a removable wheeled foot installed on the kick stand 32. Note than with the kick stand extended, and the wheels installed, the rod holder 10 leans back toward the kick stand, but the individual rod holders 14 are roughly vertical. That means fishing rods in the rod holder 10 will also be roughly vertical, which is desirable for cleaning the rods and for moving them while in the rod holder 10. Keeping the rods in a roughly vertical position may help a user move the rod holder 10 and rods without hitting things. This physical arrangement is not essential, but does provide benefits.

The features allowing the rod holder 10 to be easily moved and used outside the truck bed make the present invention much more useful than prior art rod holders. With the present invention, the rod holder portion 10 may be removed from a pick-up truck bed with all the rods still in place. The rod holder portion 10 may be easily moved to a convenient location for cleaning the fishing gear, and the kick stand 32 can then be engaged. The rod holder portion 10 is then stable and the rods and reels and the rod holder portion 10 can all be washed easily by a user.

Once the fishing rods and reels are clean and have dried, the kick stand 32 may be disengaged, and the user may use the handle 34 and wheels 30 to roll the entire assembly into a location for storage. In this manner, a single apparatus may be used (1) to hold the fishing rods and reels in the vehicle for transport to and from a fishing location; (2) to hold the fishing rods and reels in a convenient location for cleaning and/or maintenance; and, (3) to hold the fishing rods and reels for storage in a secure location. The kick stand 32, handle 34, and wheels 30, when combined with the unique design of the present invention allow a single apparatus to do what may have required three different devices in the past. And because the present invention is so solid and robust, the present invention provides a more stable and secure structure for the fishing rods and reels than most prior art devices.

For example, there are a variety of fishing rod holders designed to hold rods and reels being stored. Some of these are mobile, with small wheels or casters mounted on the bottom of a base, which is typically made of wood. These racks can be moved, but they are very top-heavy with a number of fishing rods and reels in place, and as a result, they are not very stable. These racks are also unsuitable for use while washing the tackle, because they are often made of wood and have various parts that should not be exposed to water. The present invention overcomes all these problems by providing a very solid and secure holder for the fishing rods and reels that can be exposed to water, even to salt water, and that uses large enough wheels to allow for easy movement of the entire assembly. It is a vastly superior design to the prior art.

FIG. 2 also shows how the individual rod holder 14 are attached to the first rod holder support member 22 and the second rod holder support member 24. This construction is explained in more detail below, but in a preferred embodiment, each individual rod holder 14 is welded to a support member. The present invention, in a preferred embodiment uses aluminum tubing and sheet material with welded connections at most points. Mounting materials (e.g., nuts and bolts) are made of stainless steel or other corrosion-resistant materials. In a preferred embodiment, the present invention is highly resistant to corrosion from exposure to salt water. This makes the invention particularly suitable for use by salt water anglers.

Figure 7A:
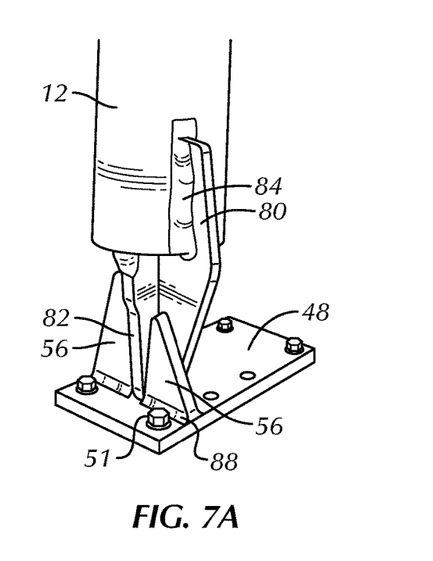
FIGS. 7A-7C are close up views of the tab and slot mounting configuration of the invention.
Figure 7B:
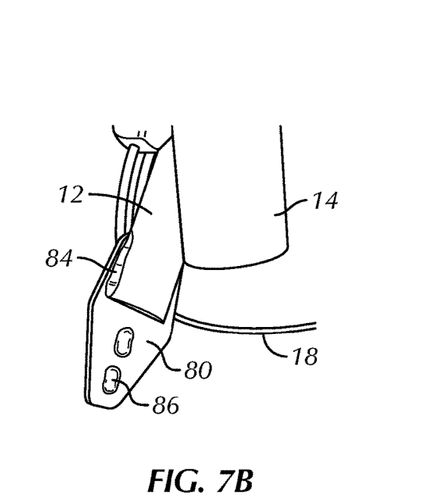
Figure 7C:
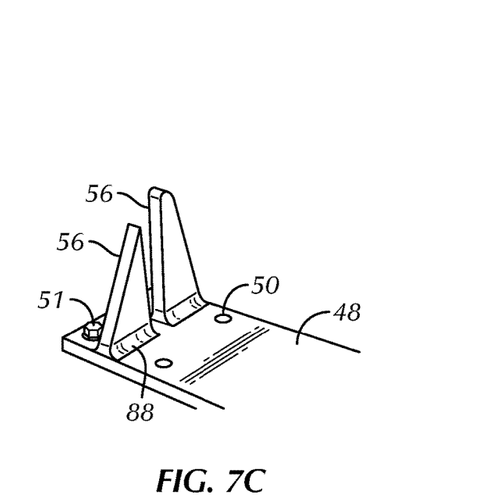

FIG. 3 provides a close-up view of the invention during the installation or removal process. The rod holder portion 10 is shown with its lower end secured to the mounting base 16. The configuration for this connection is shown in FIGS. 7A-7C and described in more detail below. The main support frame 12 and the female quick release mechanism 20 are shown tilted away from the mounting base 16, and in particular, from the male quick release mechanism 38, which is attached to the upper quick release flange 40. This flange 40 is connected to a lower quick release flange 42, which is connected to the mounting base 16. This configuration is preferred, but not essential, because it allows for three-dimensional adjustments to the male quick release mechanism 38. The kick stand 32 is also shown in its stored or disengaged position.

To complete the installation, the rod holder portion 10 is moved toward the mounting base 16, so that the male quick release mechanism 38 is engaged with the female quick release mechanism 20. Once engaged, the quick release structures will securely attach the rod holder portion 10 to the mounting base 16. The upper quick release flange 40 has a locking cable hole 41, which aligns with a similar hole in a flange on the main support frame 12 when the quick release mechanisms are engaged. When the locking cable 18 is threaded through these holes, the rod holder portion 10 can be locked to the mounting base 16, thus preventing a would-be thief from removing the rod holder portion 10, with the rods and reels, from the truck.

The mounting base 16 is shown separately in FIG. 4. It has an upper mounting structure 44, which is designed to allow mounting to the upper rim or rail of the truck bed. Full-size pick-up trucks tend to have fairly standard sized beds, to this height can be fixed to work with most full-size trucks. Several upper mounting holes 46 are provided to allow a user options on how to secure the mounting base 16. Upper mounting bolts 47 are used in the embodiment shown to secure the upper mounting structure 44 to the upper rim section of a truck bed.

The lower mounting structure 48 is used to secure the base 16 to the lower, horizontal part of the truck bed. There are numerous lower mounting holes 50 provided in order to ensure that the base 16 will work with any model of truck. Lower mounting bolts 51 are used in the embodiment shown to secure the lower mounting structure 48 to the bed of the truck. The two mounting structures are connected by a horizontal base member 52, which extends from the lower mounting structure 48 toward the side of the truck bed nearest the cab, and a vertical base member 54, which extends from one end of the horizontal base member 52 to the upper mounting structure 44.

In a preferred embodiment, the entire mounting base 16 is stamped from a single sheet of aluminum, which is then bent at a 90° angle at the point where the horizontal base member 52 and vertical base member 54 meet. Alternatively, these two components may be welded to form a 90° angle, as shown in FIG. 4. It is also possible to use a two-piece structure for the vertical base member, with the two pieces bolted together through vertical slots. Such a configuration would allow the upper mounting structure 44 to be moved up or down to fit in a particular situation. Even though truck beds are of fairly standard sizes, particular users may have altered their trucks in ways that create a need for flexibility in the configuration of the present invention. Using a two-piece vertical base member 54, as just described, would provide such flexibility.

The lower mounting structure 48 also has a pair of slotted extensions, which are designed to engage mating structure on the rod holder support frame 12. This part of the invention is shown in more detail in FIGS. 7A-7C.

The mounting base 16 is secured to the pick-up truck bed in at least four separate places: near each end of the upper and lower horizontal members shown in FIG. 4. This configuration provides a very stable and secure connection to the truck bed. The mounting points are spaced far apart (at least a foot apart in a preferred embodiment) and attach directly and securely to the truck bed. In a preferred embodiment, the mounting base 16 is bolted to the truck bed. When the rod holder 10 is installed on the mounting base 16, the result is a very secure and stable device that is capable of holding numerous large, heavy fishing rod and reel combinations.

FIG. 5 provides a close-up view of some of the locking features of the present invention. Part of the main support frame 12 is shown, with a welded-on flange 60 that supports the female quick release mechanism 20. The flange 60 has a locking cable hole 61, which is aligned with the locking cable hole 41 of the upper quick release flange 40. The locking cable 18 passes through both of these holes and is secured by a cable lock 62, thus locking the rod holder portion 10 to the mounting base 16. Other structures and methods could be used to lock these components to each other, but the arrangement shown in FIG. 5 is one preferred embodiment.

In preferred embodiments, the quick release structure of the present invention is adjustable in three dimensions. For purposes of explaining this feature, the x-direction is defined as the horizontal, longitudinal axis of the pick-up truck bed, the y-axis is the horizontal direction running across the bed of the truck, and the z-axis is the vertical direction. The upper quick release flange 40 is connected to the lower quick release flange 42 through two slotted holes 64 in the upper flange 40 (the slotted holes could be in either flange). The holes 64 in the upper quick release flange 40 are slotted along the y-axis, and thus provide adjustment in that direction using the upper to lower flange bolts 66. The male quick release mechanism 38 may be moved along the x-axis using the two nuts 68 that connect that mechanism to the upper flange 40, thus providing adjustment in that direction.

Figure 6:
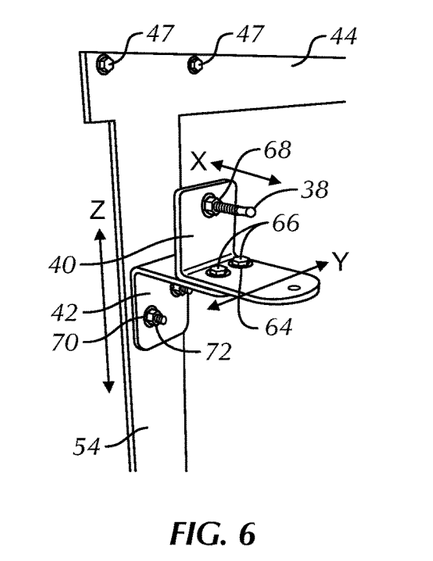
FIG. 6 is a close-up view of quick release components of the mounting base.

Adjustment along the z-axis is provided by the connection of the lower flange 42 to the vertical base member 54, in the embodiment shown in FIG. 6. The lower flange 42 has two slotted holes 70, with the slots running along the z-axis, thus providing adjustment in that direction using the mounting bolts 72. By allowing adjustment in three directions, the present invention allows for a very precise adjustment of the male quick release mechanism 38 in order to allow perfect alignment with the female quick release mechanism 20 of the rod holder portion 10. These adjustments can be performed by a user at any time if needed to ensure optimal operation of the invention.

FIGS. 7A-7C show the lower mounting structure of a preferred embodiment of the present invention. The structure shown provides a solid and secure connection between the rod holder portion 10 and the mounting base 16 using a tab and slot configuration. Other structures could also be used, so long as the rod holder portion 10 is prevented from moving in the x or y direction, as those directions were defined above. Movement in the z-direction is prevented by the quick release connection, and to an extent by the weight of the device and the rods and reels it holds. The lower connection structure shown in these figures allows for quick and easy install and removal, while also being quite strong and rigid.

In FIG. 7A the lower end of one side of the main support frame 12 is shown with an engaging member 80 extending outward along the longitudinal axis of this part of the frame 12. The engaging member 80 is a tab in this embodiment, and it is shown with a weld 84 connecting it to the lower end of the support frame 12. A perpendicular side tab 82 is also shown. In the configuration shown, the main tab of the engagement member 80 is aligned along the x-axis, while the side tab 82 is aligned with the y-axis. In this embodiment, these two tab structures together form the engaging member and this structure prevents motion in the direction opposite their alignment. That is, the main tab 80 prevents the rod holder portion 10 from moving in the y-direction, while the side tab 82 prevents the rod holder portion 10 from moving in the x-direction. A pair of these engaging members is used, one at each lower end of the main support frame 12.

The lower mounting structure 48 of the mounting base 16 has a receiving member 56, which is shown as a slotted extension in this embodiment. Some of the many possible mounting holes 50 and mounting bolts 51 are also shown. These bolts 51 secure the lower mounting structure 48 of the mounting base 16 to the horizontal, lower surface of the truck bed. The receiving member 56 (also referred to as a slotted extension, the form shown in the figures) extends in an upward direction and has a slot near its middle. In the embodiment shown in FIG. 7A, the receiving member 56 is actually made of two triangular pieces of aluminum, with each piece welded to the lower mounting structure 48.

When the rod holder portion 10 is being installed in a truck bed, the engaging member 80 is positioned just inside (i.e., toward the center of the truck bed) the inner surface of the receiving member 56. The side tab 82 then slides into the slot of the receiving member 56, while the main tab of the engaging member 80 rests against, or very close to, the main surface of the receiving member 56. This tab and slot configuration is very simple to use and prevents motion in both the x and y directions.

Other forms may be used for the engaging members and receiving members. For example, the main support frame 12 might have a lower end made of the same metal tubing used to construct the frame (i.e., with no additional structure attached to it. This tubing end is the engaging member in this embodiment, and it might have a hole through it to receive a pin or bolt (e.g., a cotter pin would work well for this purpose). The receiving member mounted to the base 16 could be a solid piece of bar stock sized to fit snugly inside the tubing of the main frame 12, or the receiving member could be tubing with an inside diameter sized to fit over the outside of the main frame tubing. In either of these forms, the receiving member might also have a hole though it of the same size as the hole through the engaging member, so that once the members have been engaged, a pin or bolt could be pushed through the holes to secure the main frame 12 to the mounting base 16. It is expected that other variations on the structures for the engaging members and receiving members are possible, and the present invention is intended to encompass any such variations that are within the common knowledge of those with skill in the art.

In one variation on this embodiment, the tab 80 has a notch in one side and the slotted extension 56 (shown in FIG. 7C) has a pin or other structure configured to slide into the notch of the tab 80. In this embodiment, when the rod holder 10 is placed on the mounting base 16, the pin engages with the notch in tab 80, thus securing the rod holder 10 to the mounting base 16 in the vertical direction (i.e., the z-axis). This version of the invention provides additional stability because it further prevents movement of the rod holder 10 in the vertical direction. That is, this feature prevents any bouncing of the rod holder 10 relative to the mounting base 16. To remove the rod holder 10, the quick release mechanisms (described elsewhere) are released, and the rod holder 10 is tilted back enough to allow the pin and notch to disengage. This feature is not illustrated in the figures, but is easily understood by those with skill in the art from this description.

FIG. 7B shows the opposite side of the lower end of the main support frame 12 and the main tab 80 of a preferred embodiment. The weld 84 secures the main tab 80 to the support frame 12. The side tab 82 (not visible in FIG. 7B) is welded to the main tab 80 by the plug welds 86. The all welded construction of these parts provides a solid and robust structure.

FIG. 7C shows a close-up of the slotted extension 56, with is secured to the lower mounting structure 48 using weld 88. Mounting holes 50 and mounting bolts 51 are also shown in FIG. 7C. The slotted extensions are plug welded to the mounting base 16, which provides a very secure attachment between relatively small pieces.

The welded construction of several key components of the rod holder portion 10 is visible in FIG. 8. The different sections of the main support frame 12 are connected using welds 90. In a preferred embodiment, the support frame is constructed from one-inch or larger OD aluminum alloy tubing having a wall thickness of at least ⅛ inch. A preferred material is type 6061-T6 aluminum alloy, with the welds being either metal inert gas (MIG) or tungsten inert gas (TIG) to provide robust and secure welded connections between all components. The welds may use type 4043 or 5356 alloy filler for strength and durability.

The flat sheet parts of a preferred embodiment use at least 3/16 inch thick sheet material, with type 5052 aluminum alloy being one preferred material. Some pieces (e.g., the slotted extensions 56, and the main tab 80 and side tab 82) may be constructed from ¼ inch sheet aluminum alloy for added strength. All hardware (e.g., nuts, bolts, washers, the male quick release mechanism) are made from stainless steel or other material that is highly corrosion resistant.

As seen in FIG. 8, in a preferred embodiment, each individual rod holder 14 is welded to a bracket 92, and each bracket 92 is welded to the support frame 12. The tubing pieces of the main frame 12 are welded together at welds 90. The female quick release mechanism 20 is mounted on a female quick release flange 98, which is welded along two sides to the main support frame 12. The female quick release flange 98 has a hole to allow for a cable lock or pad lock. When the rod holder portion 10 is installed, the female quick release flange 98 aligns with the upper male quick release flange 40, and each of these flanges have holes that also align, allowing the two main components to be locked together (see discussion of FIG. 5, above, for more detail on the locking process). A second locking flange 96 is also shown in FIG. 8, which may be designed to align with a corresponding lock flange on the mounting base 16. This arrangement provides two separate locking connection points on each side of the invention, for a total of four.

Figure 9:
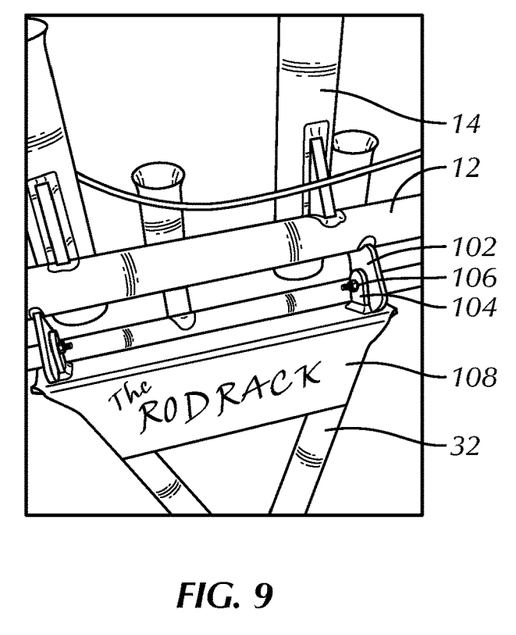
FIG. 9 is a view of the kick stand connections to the support frame.

The kick stand 32 is shown in more detail in FIG. 9. There are mounting tabs 102 welded to the main support frame 12. These mounting tabs 102 have an engagement surface on their distal ends that comes into contact with the kick stand frame structure 108 when the kick stand 32 is fully extended. Other methods of stopping the rotation/extension of the kick stand 32 may be used, but it is important that some structure be incorporated to allow the kick stand 32 to swing out to the correct position but no farther. An adjustable mechanism for this purpose could be constructed with a bolt and nut secured to the main support frame 12 or to a flange or tab welded to the support frame 12. This configuration would allow for fine adjustments of the engaged position of the kick stand 32.

The kick stand 32 has mounting tabs 104 welded to the kick stand frame structure 108. These tabs 104 align with the main frame tabs 102, and the two sets of tabs are joined by a bolt and nut system. The bolts are tightened enough to provide some resistance to rotation of the kick stand 32, but still allow the kick stand 32 to be rotated into its engaged position without much force applied. The proper amount of friction for this purpose is easily obtained by tightening or loosening the nuts 106. A locking nut is preferred for this use in order to maintain the proper tightness once it has been achieved, while still allowing for later adjustments.

The present invention may utilize a type of locking nuts in order to reduce the risk of theft. For example, these nuts may be used to secure the base 16 to the body of a pick-up truck. In addition, locking nuts may be used to connect the upper quick release flange 40 and the lower quick release flange 42. These locking nuts may take any form, and several designs of such nuts are in common use. Some use a unique geometric pattern for the outer surfaces of the nut, so that the nuts may only be tightened or loosened using a special tool. Other designs also require use of a special tool designed to engage with some physical feature of the nut that prevents use of standard wrenches or sockets. Whatever special tool is required to operate the particular type of locking nuts used with the invention, it is preferred that this tool be provided to the purchaser when the rack is purchased. This is important, because each special tool is like a key and will only operate the specific locking nuts used on a specific rack. Purchasers will be asked to complete a registration form which identifies their particular keyed tool, so that it can be replaced later, if the originally-supplied tool is lost.

Figure 11:
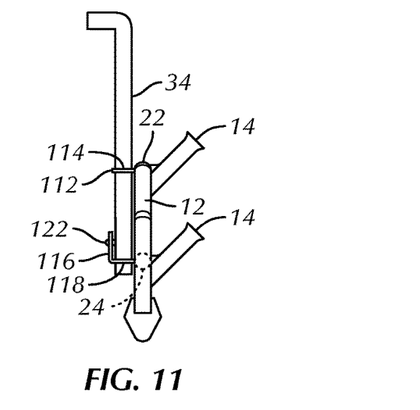
Figure 12:
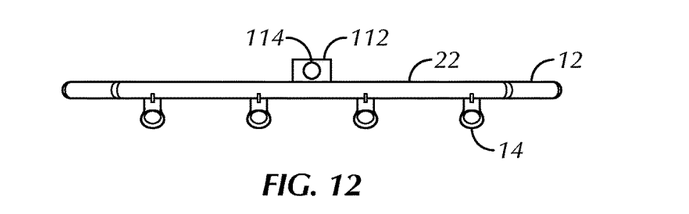
Figure 13:
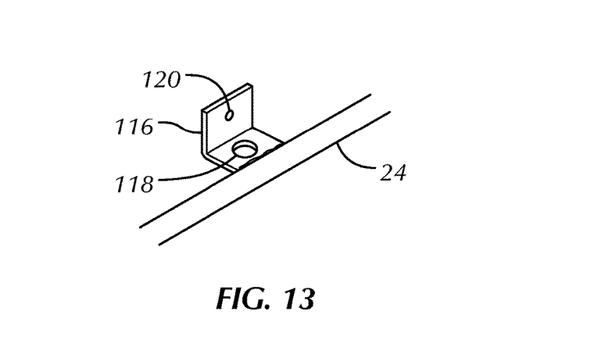
Figure 14:
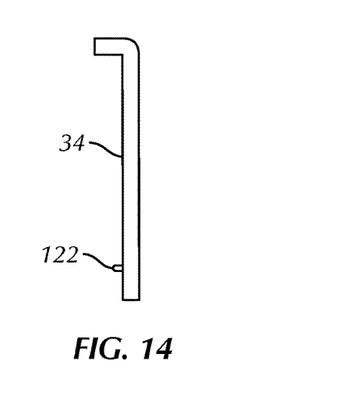
Figure 15:
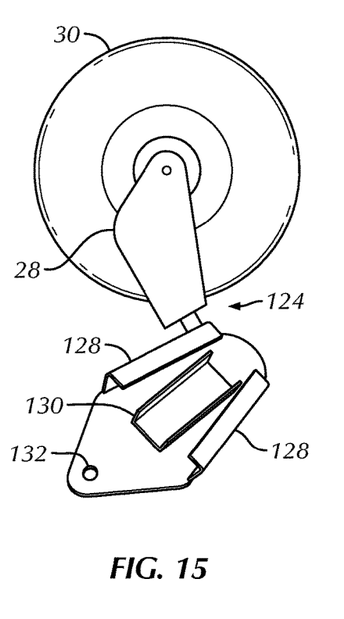
FIGS. 15-19 are various views of an embodiment of the invention having removable wheel assemblies.
Figure 16:
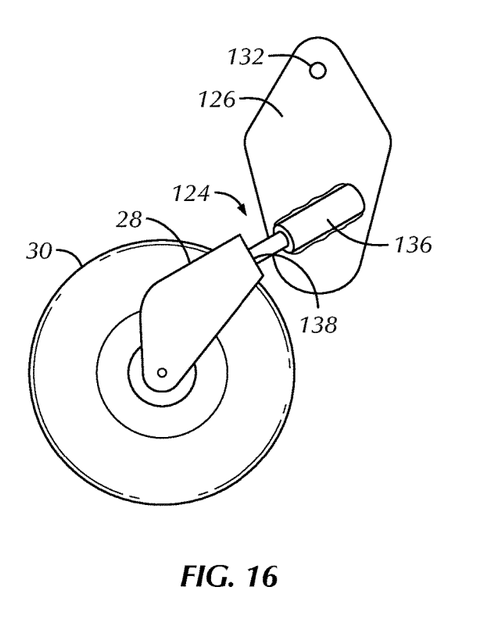

The invention also may include a removable handle 34, which is shown in FIG. 2 and in more detail in FIGS. 10-14. In FIG. 10, the removable handle 34 is shown together with the first rod holder support member 22, the second rod holder support member 24, and the main frame 12. FIG. 12 shows a top-view of one design, which uses an upper handle support plate 112 that has a hole 114 sized to fit the handle 34. FIG. 11 shows how the handle 34 passed through the hole 114 and then secured to a lower handle support plate 116. In FIG. 13, the lower support plate 116 is shown in more detail. This plate 116 has a large hole 118 (sized to fit the handle 34) and a smaller hole 120 on an angled section of the plate 116. There is a depressable button 122 in the handle 34 near its lower end, as shown in FIG. 14.

When installed, the handle 34 passes through the hole 114 in the upper support plate 112 and a short length of the handle 34 also passes through the hole 118 in the lower support plate 116, as shown in FIG. 11. The depressable button 122 then extends outward through the hole 120 in the lower plate 116, which stops the travel of the handle 34 and secures it in place. This design provides a sufficiently robust connection because the handle 34 is prevented from moving in the X and Y directions by the holes 114 and 118, and from moving in the Z direction by the engagement of the depressable button 122 in the hole 120. This design provides a simple, yet strong, method of using a removable handle 34. It is preferred to make the handle 34 removable so that it is not in the way once the rack 10 is in place in a pick-up truck. The handle 34 might interfere with the reels, or possibly rods, placed in rod holders near the center of the rack 10.

Figure 17:
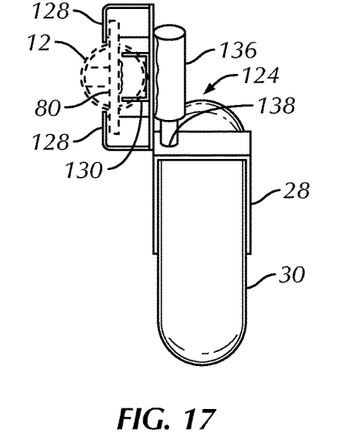
Figure 18:
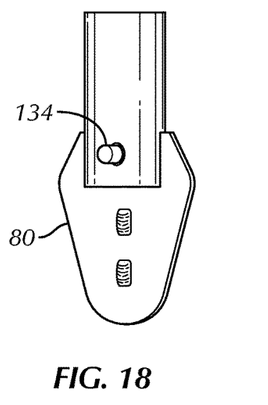

As an alternative to the wheel 30 shown in FIG. 2, removable wheels 30 may be used on the ends of the main frame 12, as shown in FIGS. 15-18. The removable wheel assembly 124 is designed to slide over the engaging member 80 (a tab in this embodiment) at the ends of the frame 12. The removable wheel support plate 126 has a pair of outer engagement channels 128 and a spacing bracket 130. As shown in the top view of FIG. 17, when the removable wheel assembly 124 is installed, the engagement channels 128 engage with the outer edges of the tab 80. The spacing bracket 130 keeps the support plate 126 far enough from the tab 80 so that the plate 126 may slide over the outer edge of the tubing of the main frame 12, as seen in FIG. 17. These components are sized to provide a snug and solid fit between the support plate 126 and the tab 80 and main frame 12.

There is, in this embodiment, a depressable button 134 at the lower end of the main frame tubing 12, on the side of the tubing opposite the tab 80. A mated hole 132 is cut in the support plate 126 so that when the wheel assembly 124 is slid into place over the tab 80 and lower tubing end, the button 134 will extend through the hole 132, thus securing the removable wheel assembly 124 in place. This design is simple, but robust. The wheel bracket 28 is connected to the support plate 126 by a welded-on wheel support 136 and a swivel 138. Alternatively, the wheel support 136 may be bolted on in a manner that allows some adjustment radially around the bolt, which would allow for some variation in the positioning of the wheel 30. The pair of installed wheel assemblies 124 are shown at each lower end of the main frame 12 in FIG. 19.

A removable wheeled foot 142 may be used with the kick stand so that the entire rack 10 is easily moved on wheels, as shown in FIGS. 20-23. The removable wheels described above and the removable wheeled foot 142 may be installed when the rack 10 is removed from a truck. When this is done, it is possible to leave numerous fishing rods and reels in the rack and to easily move the rods around. The wheels may have locking mechanisms that allow the rack 10 to be stopped in a desired location. This may be done, for example, while washing the rods, reels, and rack, or when the rack with rods and reels in place, is stored. This capability of the present invention is a substantial improvement over the prior art.

As shown in FIGS. 20-23, the removable wheeled foot 142 has a wheel 144 (more than one wheel could be used, but a single wheel is sufficient support in most cases), which is housed in a swivel bracket 146. A wheeled foot support plate 148 is used to attach the foot 142 to the kick stand 32. Engagement channels 150 on each outer edge of the support plate 148 are sized and positioned to slide over the outer edges of the kick stand 32. A pair of small holes 152 in the support plate 148 are engaged by depressable buttons 154 near the lower end of the kick stand 32. The support plate 148 slides onto the kick stand 32 until the engagement channels 150 engage the outer sides of the kick stand 32 and the depressable buttons 154 extend into the holes 152. An angled plate 156 is used at the lower end of the support plate 148, and the wheel swivel bracket 146 or another structural part of the wheel assembly is connected to angled plate 156. The angled plate 156 is positioned at an angle selected to align the wheel 144 with the removable wheel assemblies 124 (or other wheels) mounted at the ends of the main frame 12. This design provides a simple, but robust, wheeled foot 142 for the kick stand, which allows the entire rack to be rolled on wheels, as seen in FIG. 20. These features allow the present invention to be moved around with the rods in place with all the parts working together, but not interfering with each other.

In addition, in a preferred embodiment, the kickstand is configured so that when in the extended position, there is a locking mechanism or simply an increased friction fit so that the kick stand is not inadvertently moved out of the extended position. This feature would prevent accidentally retracting the kickstand, which could result in the rod holder 10 and rods falling to the ground. A pin attached to the kick stand 32 or main frame 12 by a small cable could be used to secure the kick stand in either the retracted or extended position, thus ensuring it will not be accidentally moved from either position. Depressable buttons and holes (e.g., of the type shown and explained with the removable wheel assemblies and removable wheeled foot) could also be used to keep the kickstand 32 in either the retracted or extended position. Any suitable structure for this purpose would suffice and the invention is not limited in this regard.

When these wheels or wheel assemblies are used, the present invention provides a new and useful method for cleaning and storing fishing rods and reels. The rod holder 10 is removed from the mounting base 16 with the rods and reels still in the rod holder 10. The wheel assemblies are then installed, a step that may be performed while the rod holder 10 is still in the truck bed or after it has been removed from the truck.

In some installations, the rod holder 10 with installed wheels or wheel assemblies will be too wide to roll through the truck bed, because of the wheel wells. If, however, the rod holder 10 is narrow enough to roll past the wheel wells, it may be preferable to install or engage the wheels or wheel assemblies while the rod holder 10 is still in the truck bed, because that would allow a user to easily roll the rod holder 10, with rods still in it, toward the back of the truck bed.

Alternatively, the rod holder 10 may be lifted and carried out of the truck and the wheels or wheel assemblies may then be installed or engaged. The kick stand is engaged, either with or without a wheel, to support the rod holder 10 out of the truck. The rod holder 10, and the rods and reels installed in it, may then be washed and allowed to dry. The rod holder 10, with the now clean and dry rods and reels still in it, may be rolled into a location for storage (e.g., a garage or storage building). This process allows a single rod holder to be used to hold rods and reels for transport to and from a fishing location, to wash and dry the rods and reels after return, to store the rods and reels, and to easily move the entire assembly around between these operations. This process effectively eliminates the need for separate rod holders or other devices to perform the various parts of these operations.

The preceding description is provided to illustrate certain preferred embodiments of the present invention. This description is not limiting and persons with skill in the art will recognize the existence of other variations on the structures and methods described above. All such variations, to the extent they are consistent with the preceding description and the following claims, are intended to be within the scope of the invention set forth in this patent.

I claim:

1. An apparatus comprising:
   a. mounting base configured for installation in the bed of a pick-up truck, the mounting base having a first quick release mechanism and a pair of receiving members; and,
   b. a fishing rod holder, further comprising:
      i. a main support frame constructed of metal tubing having a diameter of at least one inch;
      ii. a first rod holder support member constructed of a single piece of metal tubing having a diameter of at least one inch, and where the first rod holder support member is connected to the main support frame;
      iii. a second rod holder support member constructed of a single piece of metal tubing having a diameter of at least one inch, and where the second rod holder support member is connected to the main support frame;
      iv. a plurality of individual rod holders connected to the first and second rod holder support members, where there are at least four individual rod holders connected to the first rod holder support member and at least five individual rod holders connected to the second rod holder support member;
      v. a pair of engaging members at lower ends of the main support frame, where the engaging members are configured to quickly and securely engage with the receiving members of the mounting base; and,
      vi. a second quick release mechanism configured to engage with the first quick release mechanism of the mounting base.

2. The apparatus of claim 1, wherein the first quick release mechanism is configured to allow for adjustment along three axes.

3. The apparatus of claim 2, wherein the first quick release mechanism has a male quick release member and the second quick release mechanism has a female quick release member.

4. The apparatus of claim 1 further comprising a means for:
   a. locking the fishing rod holder to the mounting base; and, b. locking each of a plurality of fishing reels to the fishing rod holder.

5. The apparatus of claim 1 further comprising a plurality of locking plates, each locking plate having a hole for a locking cable, wherein a main frame locking plate is connected to the main support frame and a base locking plate is connected to the mounting base, so that when a locking cable passes through the main frame locking plate and the base locking plate, the locking cable prevents the removal of the fishing rod holder from the mounting base.

6. The apparatus of claim 1 wherein:
   a. the pair of receiving members of the mounting base consist of slotted extensions welded to the mounting base; and,
   b. the pair of engaging members of the lower ends of the main support frame consist of a tab, where each tab is configured to engage with a corresponding slotted extension, allowing for easy and secure engagement between the lower ends of the main support frame and a lower mounting structure of the mounting base.

7. The apparatus of claim 1 further comprising a pair of wheels configured for connection to lower ends of the main support frame.

8. The apparatus of claim 1 further comprising a handle configured for connection to the main support frame and a kick stand connected to the main support frame in a manner that allows the kick stand to be positioned in a first position when the apparatus is installed in a pick-up truck and positioned in a second position when the apparatus is not installed in a pick-up truck.

9. The apparatus of claim 8, further comprising a removable wheeled foot assembly configured for attachment to the kick stand.

10. The apparatus of claim 7 wherein each of the pair of wheels is removable from the main support frame.

11. The apparatus of claim 8 wherein the handle is removable.

12. The apparatus of claim 1 wherein each individual rod holder is welded to a rod holder support bracket and each such support bracket is welded to either the first or second rod holder support member.

13. The apparatus of claim 1 wherein the main support frame and the first and second rod holder support members are made of aluminum alloy tubing of at least 1.25 inches in diameter, such that the fishing rod holder is capable of supporting at least 50 pounds of fishing rod and reel combinations.

14. The apparatus of claim 9 further comprising a pair of removable wheel assemblies configured for connection to the main support frame.

15. The apparatus of claim 1 wherein the main support frame is further comprised of a plurality of metal tubing pieces welded together.

16. The apparatus of claim 1 wherein the mounting base is secured to a pick-up truck bed at four locations, with each such location being at least one foot from each other location.

17. The apparatus of claim 1 wherein the rod holder further comprises a means for securing the kickstand in either a retracted or extended position.

18. An apparatus comprising:
   a. a mounting base made from aluminum alloy at least ⅛ of an inch in thickness and further comprising:
      i. a horizontal base member configured to be bolted to a lower section of a pick-up truck bed;
      ii. a pair of slotted extensions welded to the horizontal base member;
      iii. a vertical base member configured to be bolted to an upper rim section of a pick-up truck bed;
      iv. a first quick release mechanism; and,
      v. a pair of quick release flanges configured to allow adjustment of the quick release mechanism along two axes; and,
   b. a fishing rod holder comprising:
      i. a main support frame constructed from aluminum alloy tubing of at least 1.25 inches diameter;
      ii. a first rod holder support member constructed from aluminum alloy tubing of at least 1.25 inches diameter and connected to the main support frame;
      iii. a second rod holder support member constructed from aluminum alloy tubing of at least 1.25 inches diameter and connected to the main support frame;
      iv. at least 8 individual rod holders, where each individual rod holder is connected to the first or second rod holder support member;
      v. a pair of tabs connected to lower ends of the main support frame;
      vi. a quick release mechanism; and,
      vii. a means for locking the fishing rod holder to the mounting base.

19. The apparatus of claim 18 wherein the horizontal member and the vertical member of the mounting base are made from a single sheet of aluminum alloy that is bent into the desire form.

20. A fishing rod holder comprising:
   a. a main support frame constructed from all-welded aluminum alloy tubing having a diameter of at least 1.25 inches;
   b. a first rod holder support member constructed from aluminum alloy tubing of at least 1.25 inches diameter and welded to the main support frame;
   c. a second rod holder support member constructed from aluminum alloy tubing of at least 1.25 inches diameter and welded to the main support frame;
   d. at least four individual rod holders connected to the first rod holder support member;
   e. at least five individual rod holders connected to the second rod holder support member;
   f. a quick release mechanism for securing the fishing rod holder to a mounting base installed in a bed of a pick-up truck;
   g. a means for locking the fishing rod holder to the mounting base; and,
   wherein the fishing rod holder is capable of supporting at least 100 pounds when installed in the bed of a pick-up truck.

21. A method of transporting, cleaning, and storing fishing rods and reels using the apparatus of claim 1, comprising:
   a. installing the rod holder in the bed of a pick-up truck by connecting the rod holder to the mounting base that is secured to the bed of the pick-up truck;
   b. placing a plurality of fishing rods and reels into the rod holder and transporting them to and from a desired location in the rod holder;
   c. removing the rod holder from the mounting base and from the pick-up truck bed with the plurality of fishing rods and reels still placed in the rod holder;
   d. installing or engaging a set of wheels that allow the rod holder to be rolled over the ground or other generally smooth surface;
   e. rolling the rod holder to a cleaning location with the plurality of fishing rods and reels still placed in the rod holder;
   f. cleaning the fishing rods and reels and the rod holder;

g. allowing the fishing rods and reels and the rod holder to dry; and, h. rolling the rod holder to a desired storage location with the plurality of fishing rods and reels still placed in the rod holder.

22. The method of claim 21, further comprising:

a. installing a handle for easier movement of the rod holder; and, b. engaging a kick stand with a wheeled foot to allow easier movement of the rod holder.

23. The method of claim 21, further comprising:

a. locking the fishing rods and reels to the rod holder after the items have been cleaned; and, b. locking the rod holder to the desired storage location.

* * * * *